ly appear in the progress of this disclosure.

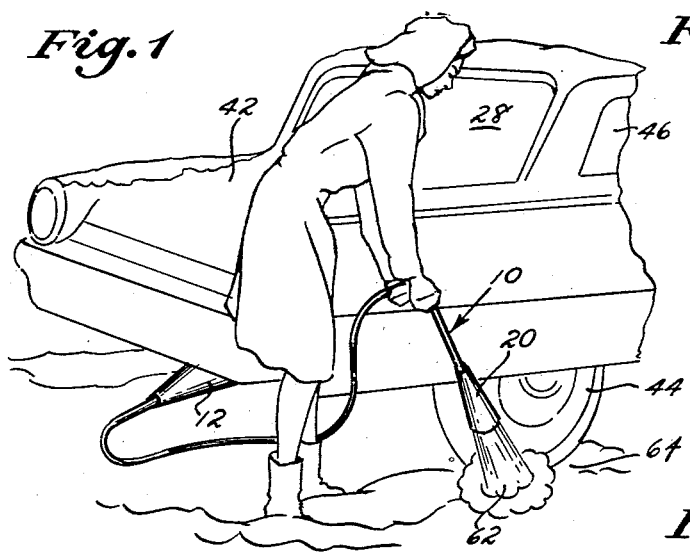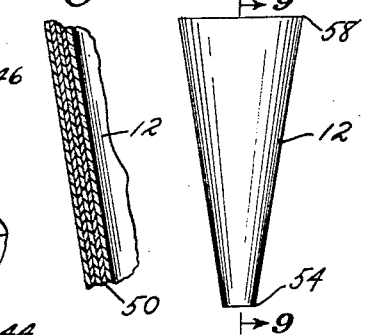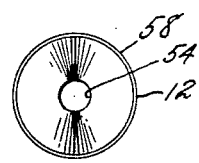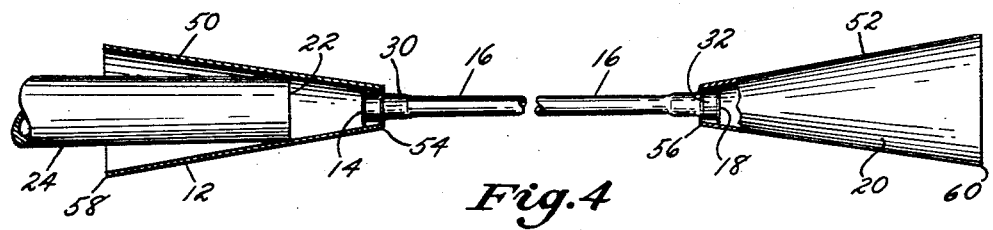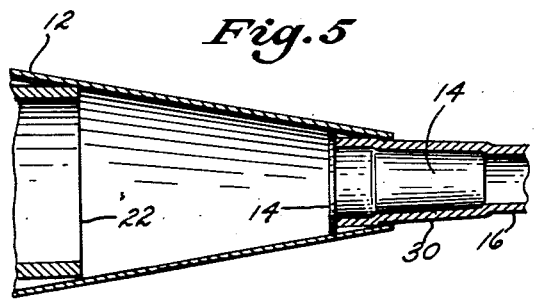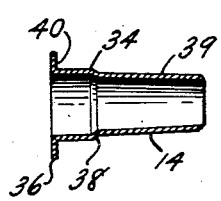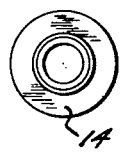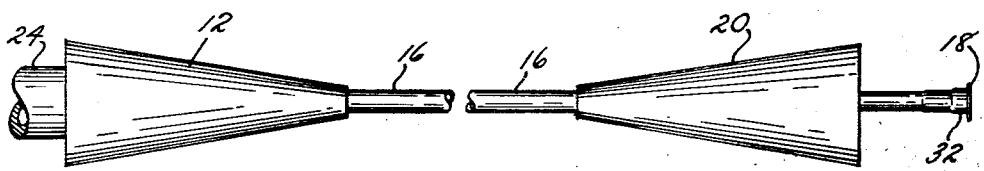

United States Patent Office 3,151,613
Patented Oct. 6, 1964

3,151,613
SNOW AND ICE MELTING DEVICE
Howard Herman Howard, 17 Clover Place,
New Rochelle, N.Y.
Filed Dec. 21, 1962, Ser. No. 246,612
1 Claim. (Cl. 126—271.1)

This invention relates generally to snow and ice melting, and more particularly to novel means and methods therefor.

The melting of snow and ice to increase traction for motor vehicles presents considerable problems, and while certain aspects thereof have responded to salt, sand and chains, it is among the objects of the present invention to provide a simple device and easy and economical mode of operation.

An object of the present invention is to utilize heat provided by the exhaust gases from the engine of an automobile to melt snow or ice at the wheels of the automobile and/or on the windshield and other windows of the car.

Another object herein lines in the provision of a melting device which is compact so that it may take a minimum of space in the car, and be readily available for use at all times.

Another object herein lies in the provision of means for controlling the flow of hot gas, by directing, concentrating and/or dispersing said flow.

A feature of the invention lies in the fact that the device may be quickly and easily connected to the tail pipe of the automobile by a person with no special skill, and no tools are required.

Another feature of the invention is that the device can be easily manipulated even under cold adverse weather conditions.

A further feature of the invention is that the convenient source of heat provided is useful for other purposes, such as freeing frozen locks.

Since the device is conducting the exhaust gases from the car, these gases may be vented to the outdoors, enabling the running of the engine in a closed garage for winter repairs.

These objects, and other incidental ends and advantages, will more fully appear in the progress of this disclosure, and be pointed out in the appended claim.

In the drawing, in which similar reference characters designate corresponding parts throughout the several views:

FIGURE 1 is a fragmentary perspective view showing the device in one manner of use thereof.

FIGURE 2 is an elevational view of one of the collector elements.

FIGURE 3 is a plan view of FIGURE 2.

FIGURE 4 is a fragmentary longitudinal sectional view, partly in elevation.

FIGURE 5 is an enlarged fragmentary sectional view corresponding to the left-hand portion of FIGURE 4.

FIGURE 6 is a longitudinal sectional view of the connecting means.

FIGURE 7 is an end elevational view of FIGURE 6.

FIGURE 8 is a fragmentary elevational view corresponding generally to FIGURE 4, but showing the discharge element 20 in an adjusted position thereof.

FIGURE 9 is an enlarged fragmentary sectional view as seen from the plane 9—9 on FIGURE 2.

In accordance with the invention, the device, generally indicated by reference character 10, comprises broadly: a collector element 12, connecting means 14, conduit means 16, interconnecting means 18, and a discharge element 20.

As will more fully appear in the course of this disclosure, the device 10 is completely reversible in use. The result of this is that the user may place either end of the device 10 in communication with the outer end 22 of the tail pipe 24 and use the remaining free end for snow melting and similar heating purposes. This enables the use of the device by a person having little instruction regarding its use, and in the dark of night. For clarity in the description, however, the device 10 is considered to be arranged as shown in FIGURE 1.

The conduit means 16 is in the form of a long flexible pipe and is preferably composed of synthetic resin tubing whose melting point is above the temperature produced by the gas flow therethrough. It is important that the tubing be adequately flexible under freezing conditions, and the tubing composed of a vinyl resin of low durometer satisfies the requirement. The pressure of the gases normally encountered are of low order so that fabric reinforcement of the tubing is not required and the tubing may be of homogeneous character. Thus the characteristics of the conduit 16 are such that it does not stiffen under severe cold nor melt under heat encountered. Furthermore, due to its insulation factor, there is low heat loss from the tail pipe end 22 to the discharge element 20. The length of the tubing is sufficient to reach from the tail pipe 24 to all of the driving wheels 44 of the vehicle 42, and the windows (not shown) 46 including the windshield and rear window 28.

Frictionally secured within the ends 30 and 32 of the conduit means 16 are the connecting means 14 and the inter-connecting means 18, and these may be of identical construction including a cylindrical body 34, an integral flange 36, an annular shoulder 38, and a tapered shank 39 (FIG. 6). The effective external diameter of the body 34 at its widest diameter is sufficient to produce a substantially gas-tight frictional fit when it is inserted within the inside of said tubing. The inner surface 40 butts up against the end of the tubing, and the tubing contracts on to the shank 39, thereby securing the means 14 and 18 against displacement.

Frictionally slidably attached upon the ends 30 and 32 are the collector element 12 and the discharge element 20, and these may be of identical construction including conical bodies 50 and 52 having narrow ends 54 and 56 and wide ends 58 and 60. The elements 12 and 20 are composed of a plurality of laminations (see FIG. 9) of asbestos containing paper with a suitable binding adhesive therebetween so that said elements are soft enough to be able to frictionally engage upon the end 22 of the tail pipe 24 to make a proper connection and yet have the necessary give to blow off the exhaust tail pipe 24 under pressure before such pressure could damage the muffler, at the same time having the property of being able to stay in water without coming apart, a necessary condition for being in snow.

The relationship of the wide ends 58 and 60 to the narrow ends 54 and 56 is such that the angle of the conical bodies 50 and 52 will accommodate the tail pipe end diameters of the usual range, will provide for proper dispersion of hot gas, and the narrow ends 54 and 56 will not pass outwardly over the flanges 36.

Thus with the device 10 arranged as shown in FIGURE 4, either element 12 or 20 may be engaged upon end 22 of pipe 24 (see FIGURE 1). This engagement is preferably made after the motor in the car has reached normal operating temperature so that the gases are at maximum temperature. The discharge of gases 62 is directed at the snow or ice 64 impeding traction until traction is obtained. Under exceptionally cold conditions, a concentration of the gases is obtained by sliding an element 12 or 20, as the case may be, back along the conduit means 16, exposing one of the means 14 or 18 so that a concentrated jet of hot gas may be directed at the part of the area to be heated (see FIGURE 8). The element 12 or 20 may be returned to its original position and mode of operation.

I wish it to be understood that I do not desire to be limited to the exact details of construction shown and set forth in this specification, for obvious modifications will occur to a person skilled in the art to which the invention relates.

I claim:

A snow melting device for use with an automobile exhaust pipe comprising: a long flexible conduit pipe having a pair of ends and composed of a low durometer vinyl resin; connecting means on one of the ends and interconnecting means on the other of the ends, the connecting and interconnecting means being identical; a conical collector element frictionally slidably mounted upon one of the ends inwardly of the connecting means; and a conical discharge element frictionally slidably mounted upon the other of the ends inwardly of the interconecting means, the collector element and the discharge element being identical in structure to allow interchangeable engagement upon the exhaust pipe, the collector element and the discharge element being composed of a plurality of laminations of asbestos containing paper with a suitable binding adhesive therebetween, providing elements soft enough to frictionally engage the end of the exhaust pipe to make a proper connection and yet have the necessary give to blow off the exhaust pipe under pressure before such pressure could damage the muffler, at the same time having the property of being able to stay in water without coming apart; whereby either the collector element or the discharge element may be placed upon the exhaust pipe, the remaining free one of the collector or discharge element being manually positionable to direct the discharge of hot gases therefrom at the material to be melted, and one of the collector or discharge elements may be slid back on said conduit pipe to expose the same for the production of a concentrated jet of hot gas.

References Cited in the file of this patent
UNITED STATES PATENTS

| | | |
|---|---|---|
| 1,882,337 | Neill | Oct. 11, 1932 |
| 2,505,311 | Vinnick | Apr. 25, 1950 |
| 2,515,341 | Giguere | July 18, 1950 |
| 2,558,023 | Walsh | June 26, 1951 |
| 2,733,668 | Pfetzing | Feb. 7, 1956 |
| 2,754,138 | Kramer | July 10, 1956 |
| 2,789,841 | Kramer | Apr. 23, 1957 |